United States Patent [19]

Mills

[11] 4,319,931
[45] Mar. 16, 1982

[54] METHOD FOR NOTCHING PALLETS

[76] Inventor: Thomas O. Mills, 219 N. Maple, Douglass, Kans. 67039

[21] Appl. No.: 124,269

[22] Filed: Feb. 25, 1980

[51] Int. Cl.³ .............................................. B27C 5/00
[52] U.S. Cl. ............................... 144/326 R; 144/1 R; 144/133 R
[58] Field of Search .................... 83/425.3, 435.2, 917, 83/878; 144/133 R, 323, 7 R, 3 R, 1 R, 326 R; 29/33 R, 429, 430, 431

[56]  References Cited
U.S. PATENT DOCUMENTS 3,735,787  5/1973  Siel ................................. 144/133 R
4,132,253  1/1979  Mills ................................... 144/323
4,133,097  1/1979  Slade .................................. 144/1 R Primary Examiner—W. D. Bray
Attorney, Agent, or Firm—Edward L. Brown, Jr.

[57] ABSTRACT

The method of notching the stringers of a ready-made pallet by a machine which has a first step which makes four vertical cuts in the stringers as the pallet passes by with the outer two cuts forming the sides of the notch; a second step which makes a horizontal cut in the stringers, intersecting all four vertical cuts, first cutting free a section of the notch between the middle two vertical cuts allowing the saw blade arbor to pass through the stringers while cutting free the two outside sections of the notch area to form a complete notch.

8 Claims, 5 Drawing Figures

METHOD FOR NOTCHING PALLETS

BACKGROUND OF THE INVENTION

A conventional wooden pallet is made up of a plurality of stringer members which are sandwiched between a plurality of slats. The slat members are traversely arranged with respect to the stringers, and attached to the tops and bottoms of the stringers by automatic nailing machines. The stringers all have a pair of notches cut along their bottom edge for receipt of the forks of a lift truck so that the pallet can be picked up from any side.

While pallet stringer notches were originally hand-cut, there have been numerous machines in recent years which automatically cut the notches as the stringers are forced through a machine in adjacent side-by-side relation. Examples of these machines are illustrated in U.S. Pat. Nos. 3,470,924 and 3,664,394. The first mentioned patent drives a row of pre-aligned stringers past a rotating horizontally positioned cutting head which grinds away the entire area of the notch in an action similar to a routing tool. The second patent mentioned incorporates a gang of vertically positioned dado blades which also grind away the entire area of the notch. One of the above-mentioned methods require that the stringers be stacked one behind the other and firmly held during the cutting operation to keep from tearing and splitting. Both of these patents require a substantial amount of power and holding force on the stringers since they grind away the entire notch area.

An advancement in the state of the art over the two above-mentioned patents is applicant's own U.S. Pat. No. 4,132,253. The basic advantage of this patent is the utilization of substantially less power by making a series of saw cuts in place of the grinding method of the two prior art systems mentioned. Still, in this patent, as in the other two patents, it was felt that the notches had to be cut in the stringer members prior to assembly of the pallet.

Most pallet assembly lines today include a nailing machine; a turning machine; sometimes a second nailing machine, and a stacking machine for the completed pallet at the end of the assembly process. At the first nailing machine, the operators are provided with stacks of pre-cut slats and pre-notched stringers which are laid out for the nailing machine to fasten one side at a time. If only one nailing machine is used in the line, the pallet must be run through the nailing machine a second time after it is turned so that the slats on the opposite side may be attached. The stack of pre-cut and notched stringers requires a notching machine similar to one of those mentioned above along with at least two operators.

The method of the present invention notches the pallet stringers after the pallet is constructed in the assembly line process, thereby eliminating two operators which previously manned the notching machine when the stringers were notched before assembly of the pallet. Due to the relatively light forces involved and energy utilized with saw cuts in place of grinding, it has become possible to cut stringer notches in an already made-up pallet. Prior to the present invention it was felt that this was not possible in light of the forces involved and amount of splitting and tearing of the stringer during formation of the notch.

A principal object of the present invention is to provide a new and improved method for notching pallets which minimizes the operators necessary for operation of the machine.

Another object of the present invention is to provide an automated notching machine which cuts a pair of notches in the stringers of a pre-assembled pallet on a single pass through the machine.

These and other objects of the invention will become apparent from a reading of the following specification and claims together with the accompanying drawing which sets forth a preferred embodiment of the present invention.

Figure 5:
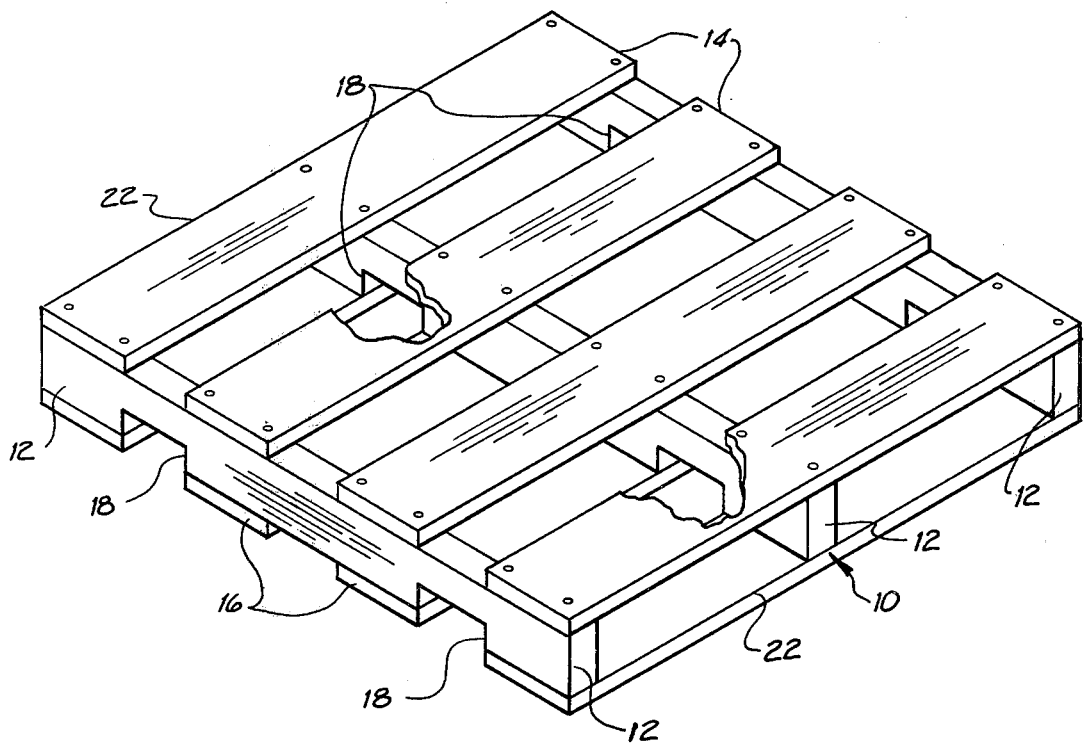
FIG. 5 is a perspective view of a typical pallet design.

Referring in detail to the drawings and more specifically to FIG. 5, a typical three-stringer pallet is generally referred to by reference numeral 10. A typical pallet has three stringer members 12 which are sandwiched between four top slats 14 and bottom slats 16. Located along the bottom edge of each stringer 12 are a pair of notches 18. The notches 18 in each stringer are in alignment so that a forklift may engage them from either side. The ends 22 of the pallet are open and also allow a forklift to engage the pallet from either end.

DESCRIPTION OF THE PREFERRED EMBODIMENT

Figures 2, 4:
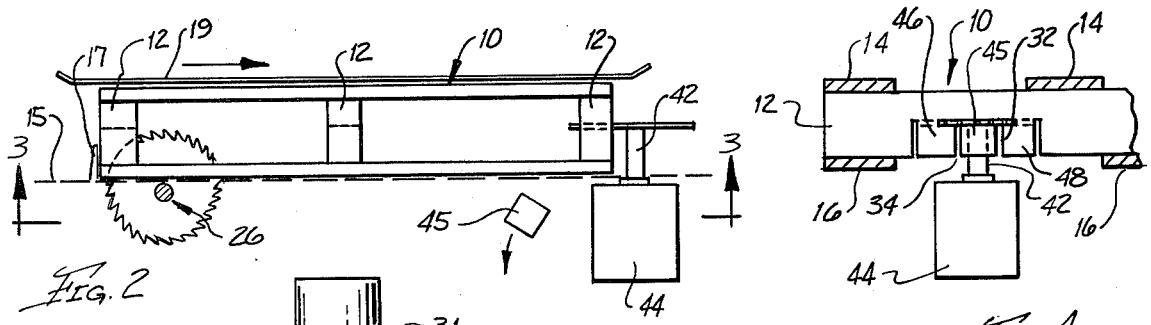
FIG. 2 is a side elevational view of a pallet passing through the notching machine of the present invention.
FIG. 4 is a partial elevational view taken along lines 4—4 in FIG. 3.
Figure 3:
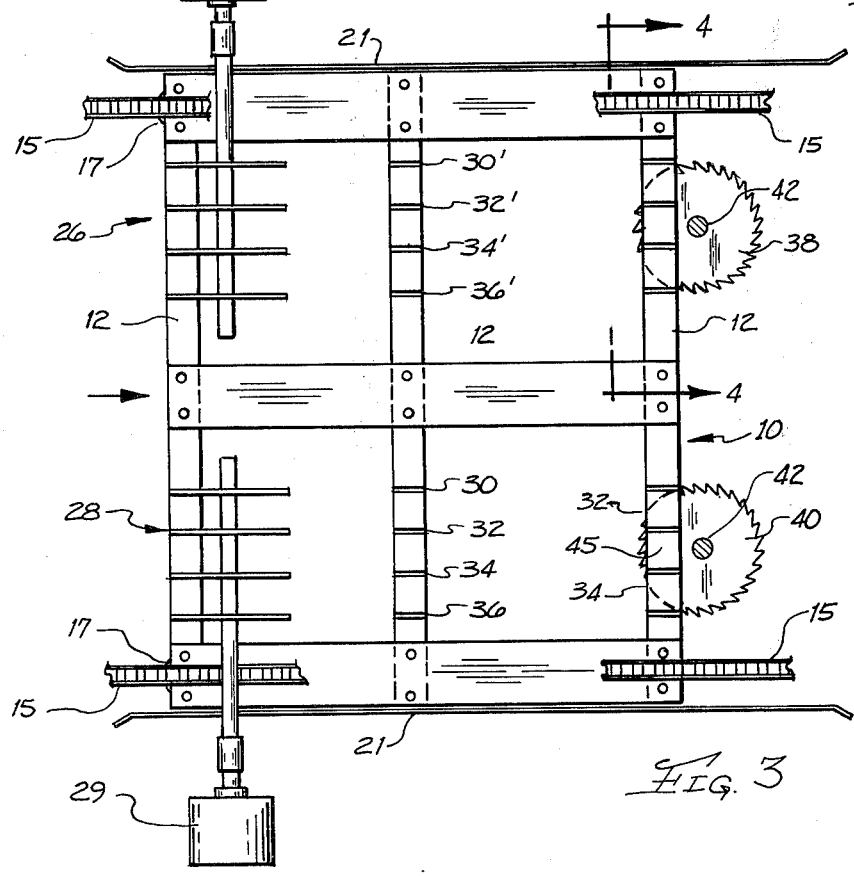
FIG. 3 is a bottom plan view of a pallet passing through the notching machine of the present invention.

FIGS. 2, 3 and 4 show an abbreviated structure for performing the method of the present invention. A more detailed showing of the notching machine, not shown here, can be found in applicant's above-mentioned U.S. Pat. No. 4,132,253. In FIGS. 2, 3 and 4, the pallet 10 is shown in the notching machine at a stage of partial completion of the notches 18. Pallet 10 has entered the notching machine from the left side of the drawing, moving from left to right on a conveyor chain 15 driven by upstanding dogs 17. Once engaged in the notching machine, the pallet 10 is restrained against upward movement by an adjustable hold-down bar 19 and lateral movement by a pair of adjustable lateral guides 21. As the pallet 10 enters the notching machine, it first passes two gangs of vertically positioned saw blades 26 and 28, which each make four vertical cuts 30, 32, 34 and 36 in the bottom of each stringer member, respectively. The gang of blades 28 can be driven by a separate motor 29, while gang 26 is driven by motor 31, or the two gangs can both be driven by a single motor, not shown in the drawing. Radius cutters can be used in place of the blades making cuts 30 and 36, to give a notch with a radius at the corners, depending on customer preference and pallet specifications.

At the second station of the notching machine, the first stringer 12 of the pallet engages two horizontally positioned saw blades or radius cutters 38 and 40 which make cuts defining the top of the notches. The horizontal cut made by blades 38 and 40 intersects all four vertical cuts 30, 32, 34 and 36, previously made in the stringers. Saw blades 38 and 40 are mounted directly on motor arbors 42 and motors 44, or belt driven by motors 39 and 31 (not shown in the drawing). As saw blades 38 and 40 begin their cuts, they first cut free a section 45 in the notch area between vertical cuts 32 and 34 which falls free, as illustrated in FIG. 2. With the notch section 45 removed, the saw blade arbor 42 is free to pass through the stringer cutting free the two outside notch sections 46 and 48, completely forming the notch 18.

The depth of the notches can be varied by utilizing a variable length saw blade arbor 42. The gangs of saw blades 26 and 28 also can be moved up or down to accommodate notch depth changes, or by adjusting the conveyor height level.

OPERATION

Figure 1:
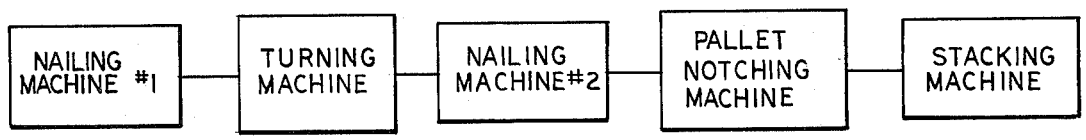
FIG. 1 is a symbolic block diagram illustrating the present invention in a typical pallet construction assembly line.

The pallet making process utilized with the present invention is illustrated in block-dagram form in FIG. 1. At the first station, nailing machine No. 1 nails all of the slat members on one side, to the three stringer members. The partially constructed pallet moves down the conveyor to the second station which turns the pallet over so that the remaining slats can be attached to the top of the pallet by the second nailing machine, or back through the first nailing machine if the process uses only one nailing machine. With the pallet completely fabricated with the exception of notches 18, it is conveyed into the notching machine from left to right by conveyor dogs 17. As the stringers 12 pass the two gangs 26 and 28 of vertical saws, two groups of vertical cuts 30, 32, 34 and 36 are made in the bottom surface of each stringer, as can best be seen in FIG. 3. As the pallet continues to move to the right, horizontal saw blades 38 and 40 begin a horizontal saw cut which intersects vertical cuts 32 and 34, allowing a notch section 45 to drop away, as seen in FIG. 2. As the pallet continues to move to the right, horizontal saw blades 38 and 40 widen their cut from the FIG. 4 position until they intersect the outer two vertical cuts 30 and 36 which allow the remaining notch sections 46 and 48 to drop away as the pallet moves along to its next stringer. When the pallet 10 exits the notching machine, it continues along its conveyor to a stacking machine which is periodically emptied. When it is desired to handle varying width pallets, the lateral guides 21 on the notching machine are adjustable to fit varying width dimensions, while the gangs 26 and 28 of saw blades also can be moved laterally as well as the horizontal saw blades 38 and 40. While not shown in the drawing, the gangs 26 and 28 are mounted on base members which attach to the notching machine and adjust laterally. The machine is also adjustable to accept varying height pallets by a vertical adjustment of bar 19 and changing the length of saw blade arbor 42. The notching machine in the process just described, requires no operators and is completely automatic. While FIG. 2 of the drawing illustrates the spacing between vertical saw cuts 30, 32, 34 and 36 to be equal, the machine can function equally well with a narrower space between the two inner saw cuts 32 and 34, so long as the space is sufficiently wide to pass the saw blade arbor 42.

Having described the invention with sufficient clarity to enable those familiar with the art to construct and use it, I claim:

1. A method for notching the stringers of an assembled pallet comprising the steps of:
   driving a pallet through a machine making four substantially vertical saw cuts in each stringer, the outer two cuts forming the sides of the notch; and
   a second step of making a horizontal saw cut in said stringers with a blade having a downwardly extending arbor, said cut being normal to the vertical cuts with the saw blade arbor positioned to pass through the notch, the horizontal cut intersecting the four vertical cuts, first cutting free a section of the notch between the middle two vertical cuts allowing the saw blade arbor to pass through the stringer while cutting free the two outside sections of the notch to form the complete notch.

2. A method as set forth in claim 1, including the step of varying the notch depth by adjusting the vertical height of the horizontal saw cut by changing the arbor height of the saw blade.

3. A method as set forth in claim 1, including the step of varying the notch depth by adjusting the vertical height of the horizontal saw cut by changing the arbor height of the saw blade and varying the depth of the vertical cuts a comparable distance by raising the saw blades which makes the vertical cuts.

4. A method as set forth in claim 1, including the step of adjusting the lateral position of the notch in the stringer by laterally moving a base member on the machine which supports the four vertical saw blades and the horizontal saw blade.

5. A method for notching the stringers of an assembled pallet comprising the steps of:
   driving a pallet through a machine making at least four vertical saw cuts in the bottom of each stringer as the stringer passes over a stationary gang of driven saw blades, the outer two cuts forming the sides of the notch; and
   a second step of making at least one horizontal circular saw cut in the stringer with a blade having a downwardly extending arbor, said cut being normal to the vertical cuts with the saw blade arbor located to pass through the notch, each horizontal cut intersecting the four vertical cuts, first cutting free a section of the notch area between the middle two vertical cuts allowing the saw blade arbor to pass through the stringer while cutting free the two outside sections of the notch to form the complete notch.

6. A method as set forth in claim 5, including the step of varying the notch depth by adjusting the vertical height of the conveyor transporting the pallets.

7. A method as set forth in claim 5, including the step of adjusting the lateral position of the notch in the stringer by laterally moving a base member on the machine which supports the four vertical saw blades and the horizontal saw blade.

8. A method as set forth in claim 1, including a second group of vertical saw cuts and a second corresponding horizontal cut so as to provide a pair of notches in a pallet with a single pass through the machine.

* * * * *